UNITED STATES PATENT OFFICE.

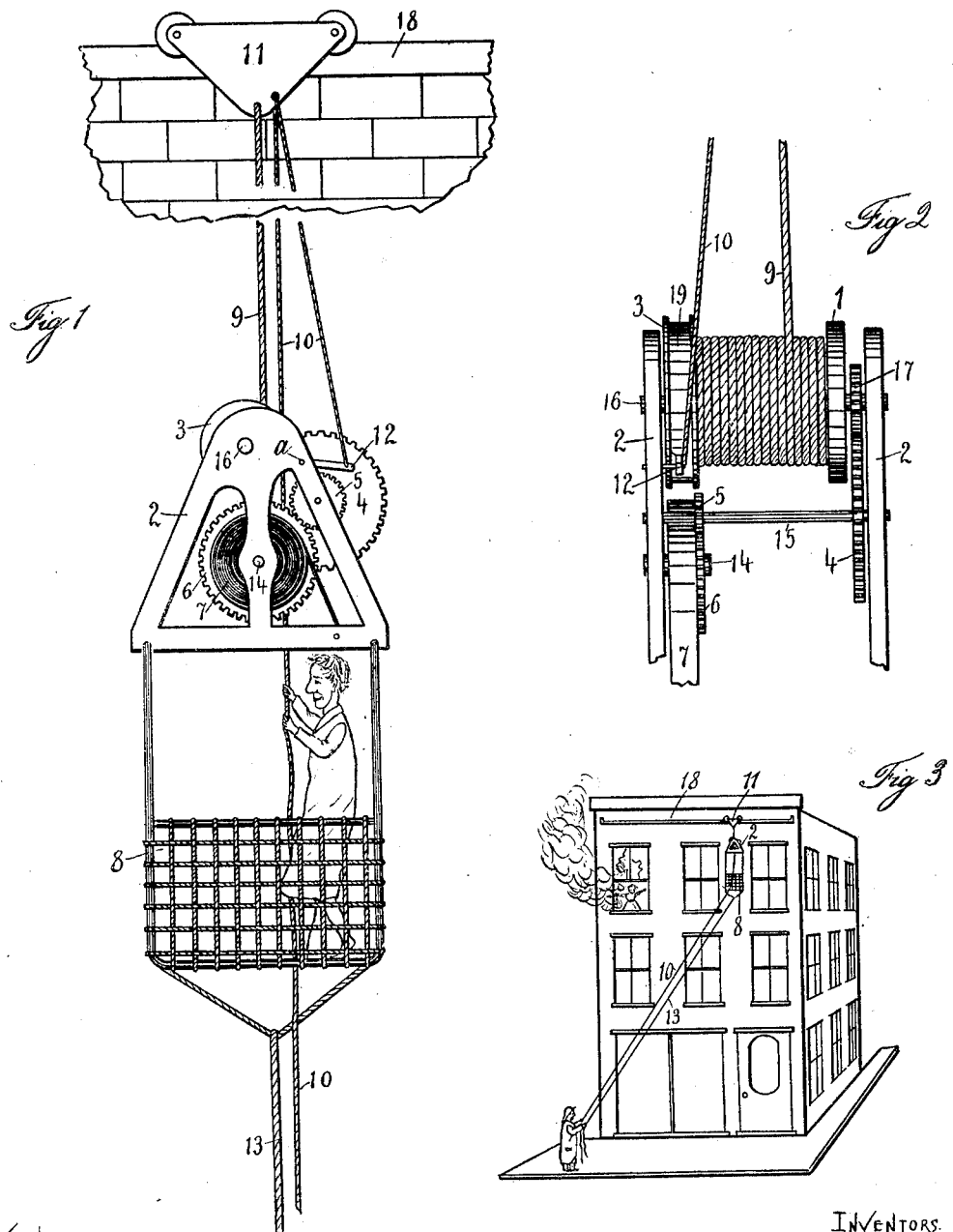

GEORGE O. CURTIS AND CHARLES R. BOLTER, OF LOGAN, IOWA.

FIRE-ESCAPE.

SPECIFICATION forming part of Letters Patent No. 673,942, dated May 14, 1901.

Application filed January 24, 1899. Serial No. 724,933. (No model.)

*To all whom it may concern:*

Be it known that we, GEORGE O. CURTIS and CHARLES R. BOLTER, residing at Logan, in the county of Harrison and State of Iowa, have invented certain new and useful Improvements in Fire-Escapes; and we do hereby declare that the following is a full, clear, and exact description of the invention, such as will enable others skilled in the art to which it appertains to make and use the same, reference being had to the accompanying drawings, which form a part of this specification.

This invention relates to an improvement in fire-escapes.

The object of our invention is to provide a fire-escape movably secured to a track and comprising a motor-operated cage so arranged that the load within the cage will carry the same downward and the motor being used to return the cage.

In the accompanying drawings, Figure 1 shows a broken view with portions removed of our cage or carrier descending with a rescued passenger. Fig. 2 shows a broken detached enlarged detail of the working elements embodying our motor, while Fig. 3 shows a view of a partly-burning building equipped with our fire-escape.

Our invention embodies, essentially, a rail 18, which may be secured by any suitable means near the upper portion of the structure in connection with which our fire-escape is to be used and upon which rail works an ordinary wheel-carriage 11, as is shown more clearly in Fig. 1. Secured to this carriage 11 is a cable 10 of a length preferably in excess of the distance the cage is to travel, and this cable 10 is made to work over a suitable brake-wheel 3, and which brake-wheel is mounted upon a shaft 16, as may be also noticed in Fig. 2, and which is provided upon one end with an ordinary band-brake embodying the brake-strap 19, which is secured to the pivoted lever 12, pivoted at the point *a*, and so arranged that when the lever 12 is shifted this brake-strap is tightly drawn over the brake-wheel 3, as is common in structures of this sort. At a point preferably opposite the brake-wheel the shaft 16 is provided with a gear 17, meshing with the gear 4 and mounted upon the shaft 15, and this shaft 15 is further provided with a second gear 5, meshing with a gear 6, mounted upon the stub-shaft 14, and to this gear 6 is secured an ordinary coil-spring 7, which spring is so wound that the strand 9 is normally coiled upon the drum 1, and when this strand 9 is unwound from said drum the unwinding is done against the tension of this coil-spring 7, so that normally this strand is in a wound condition upon the drum 1. These shafts 16, 15, and 14 are supported within the suitable frame-pieces 2 2, suitably connected, and from which depends an ordinary open cage 8, which is secured to an operating-line 13, so that by means of this line 13 the cage can be shifted in traveling upon the upper rail 18.

As it is quite possible that the occupant of the cage or carriage might lose all self-control, the operating-cable 10, secured to the brake-strap lever 12, is made to extend through the carrier 11 and then pass downward through the cage and is made of a length so that an operator standing upon the ground adjacent to the building may control the unwinding of the motor in letting the cage descend. By this means helpless passengers or freight might be piled into the cage or carrier by persons within the building and the descent controlled by an operator below the cage upon the ground.

When our fire-escape is properly constructed, it would be used as follows: The cage being either within one of the upper rooms of the building or supported upon the outside of the same, and it being desired to use the same, an operator would simply have to step into the cage or carrier, previously having grasped the brake cable or strand 10, and tightly clutch the motor by means of the powerful brake provided until a suitable number of passengers or freight had been placed into the cage or carrier, and then by slowly allowing the cable 10 to pass through his hands in releasing the brake-strap the cage would descend, when the operator would step out and the freight be removed. As soon as this weight or load had been taken out of the cage the cage by virtue of its spring-motor would be instantly carried upward, as it is of course well understood that the powerful brake described as used with our invention is normally in a released condition, so that the cage would readily rise. Then after the cage had risen to the proper height it would simply be necessary to draw it in front of the window from which the next load was to be taken, and either the operator first entering the cage could control the brake or an operator on the ground below the cage could control it, so that the cage or carrier could be lowered at a proper speed.

Our invention is noticeable because of its extreme simplicity.

Having thus described our said invention, what we claim as new, and desire to secure by United States Letters Patent, is—

1. In a fire-escape of the character described, a rail, a shifting cage, a strand depending from said cage, a spring-motor, a drum actuated by said motor, said strand winding about said drum, a brake controlling the movement of said motor, and a cage depending from said motor.

2. In a fire-escape of the character described, a supporting-rail, a shifting cage upon said rail, a strand extending from said cage, a spring-motor, a drum actuated by said motor, said strand winding about said drum, a brake in connection with said motor, a strand to operate said motor and a cage depending from said motor.

GEORGE O. CURTIS.
CHARLES R. BOLTER.

In presence of—
J. D. JONES,
WALTER G. FINLEY.